(12) United States Patent
Kodama

(10) Patent No.: US 8,427,703 B2
(45) Date of Patent: Apr. 23, 2013

(54) IMAGE PROCESSING DEVICE, COMPUTER READABLE MEDIUM, AND IMAGE PROCESSING METHOD

(75) Inventor: Mari Kodama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 264 days.

(21) Appl. No.: 12/861,116

(22) Filed: Aug. 23, 2010

(65) Prior Publication Data

US 2011/0228292 A1 Sep. 22, 2011

(30) Foreign Application Priority Data

Mar. 19, 2010 (JP) ................................. 2010-064558

(51) Int. Cl.
*G06F 15/00* (2006.01)

(52) U.S. Cl.
USPC ............ 358/1.9; 358/3.21; 358/515; 358/518

(58) Field of Classification Search .................. 358/1.9, 358/512, 515, 521
See application file for complete search history.

(56) References Cited

U.S. PATENT DOCUMENTS

| 2002/0196464 A1 | 12/2002 | Kodama et al. |
| 2007/0201094 A1* | 8/2007 | Croft ............................ 358/1.18 |
| 2009/0201522 A1* | 8/2009 | Iguchi ........................... 358/1.9 |
| 2011/0141129 A1 | 6/2011 | Nishide |

FOREIGN PATENT DOCUMENTS

| JP | A-2003-5343 | 1/2003 |
| JP | A-2011-123810 | 6/2011 |

* cited by examiner

*Primary Examiner* — King Poon
*Assistant Examiner* — Ibrahim Siddo
(74) *Attorney, Agent, or Firm* — Oliff & Berridge, PLC

(57) ABSTRACT

An image processing device includes a detecting unit and a pre-processing executing unit. Before image data is generated for a printer, the detecting unit detects first density information per image element, and detects, for the image elements, whether or not overprinting is set. If the detecting unit detects that the overprinting is set at an image element and the image element has a basic color of which first density information is set 0%, the pre-processing executing unit executes a pre-processing which changes the first density information of the image element into second density information which is greater than 0% and which is capable of being recognized as white by the naked eye.

10 Claims, 6 Drawing Sheets

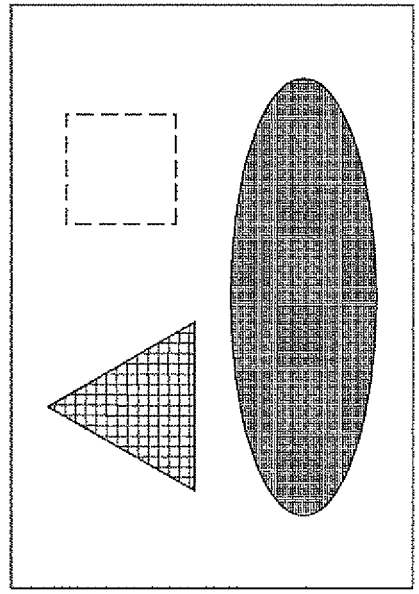
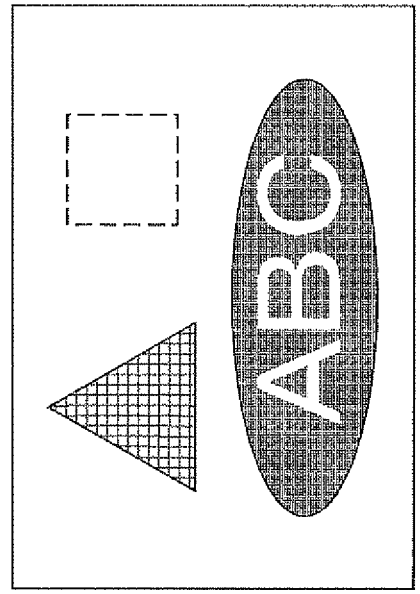
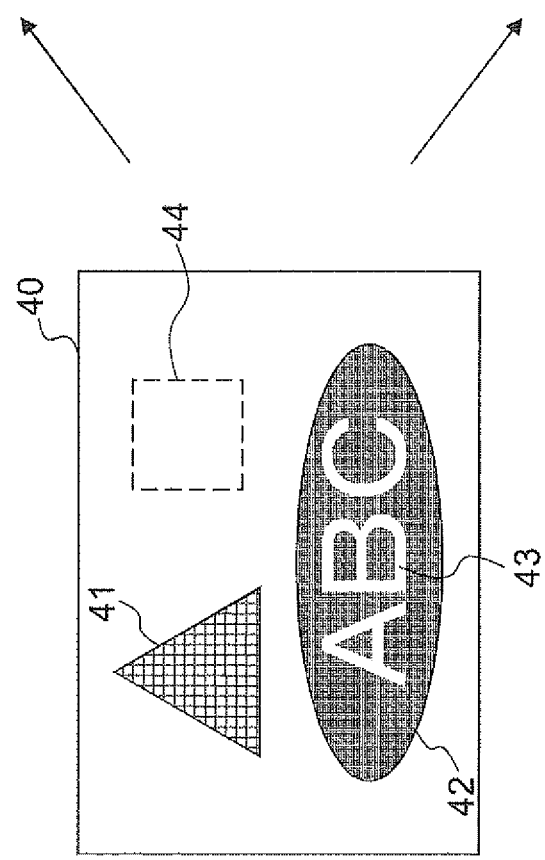

IMAGE PROCESSING DEVICE, COMPUTER READABLE MEDIUM, AND IMAGE PROCESSING METHOD

CROSS-REFERENCE TO RELATED APPLICATION

This application is based on and claims priority under 35 USC 119 from Japanese Patent Application No. 2010-064558 filed Mar. 19, 2010.

BACKGROUND

Technical Field

The present invention relates to an image processing device, a computer readable medium, and an image processing method.

SUMMARY

According to an aspect of the invention, there is provided an image processing device including: a detecting unit that, before image data, which is generated from print information including first density information per image element, is generated for a printer which prints an image by using the image data, detects the first density information per image element which is included in the print information, and that detects, for the image elements, whether or not overprinting is set; and a pre-processing executing unit that, before the image data is generated, if the detecting unit detects that the overprinting is set at an image element and the image element has a basic color of which first density information is set 0%, executes a pre-processing which changes the first density information of the image element into second density information which is greater than 0% and which is capable of being recognized as white by the naked eye.

BRIEF DESCRIPTION OF THE DRAWINGS

An exemplary embodiment of the present invention will be described in detail based on the following figures, wherein:

FIG. 4A through FIG. 4C are explanatory drawings for explaining operation of the exemplary embodiment;

DETAILED DESCRIPTION

An exemplary embodiment is described in detail hereinafter with reference to the drawings.

Figure 1:
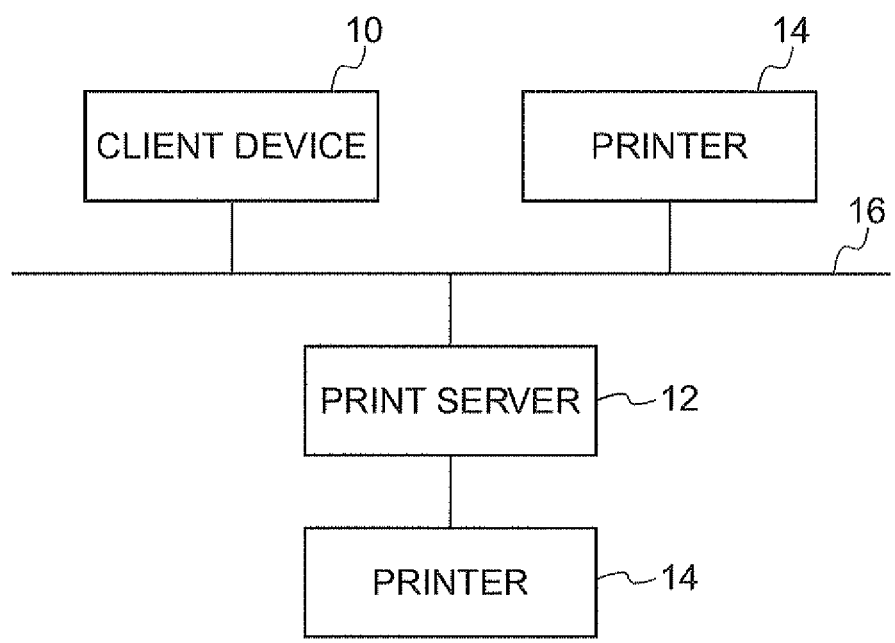
FIG. 1 is an overall structural drawing of an exemplary embodiment.

In the present exemplary embodiment, as shown in FIG. 1, a client device 10 and a print server 12 are connected via a communication unit 16. The communication unit 16 may be a public line, or may be a network such as the internet, a LAN (Local Area Network), a WAN (Wide Area Network) or the like. The communication unit 16 may be a wireless communication unit or may be a wired communication unit. A printer 14 is connected to the print server 12 either via the communication unit 16, or directly without going through the communication unit 16.

The client device 10 generates print information (details of which are described hereinafter) that is described in a page description language (e.g., PostScript) from data that is the object of printing that is generated from any of various types of application software, and transmits the print information to the print server 12.

The print server 12 analyzes the print information received from the client device 10, and expands it into bitmap image data (raster image data) (i.e., carries out raster image processing (RIP)), and outputs the image data to the printer 14.

The printer 14 prints an image by using the image data outputted from the print server 12.

Figure 2:
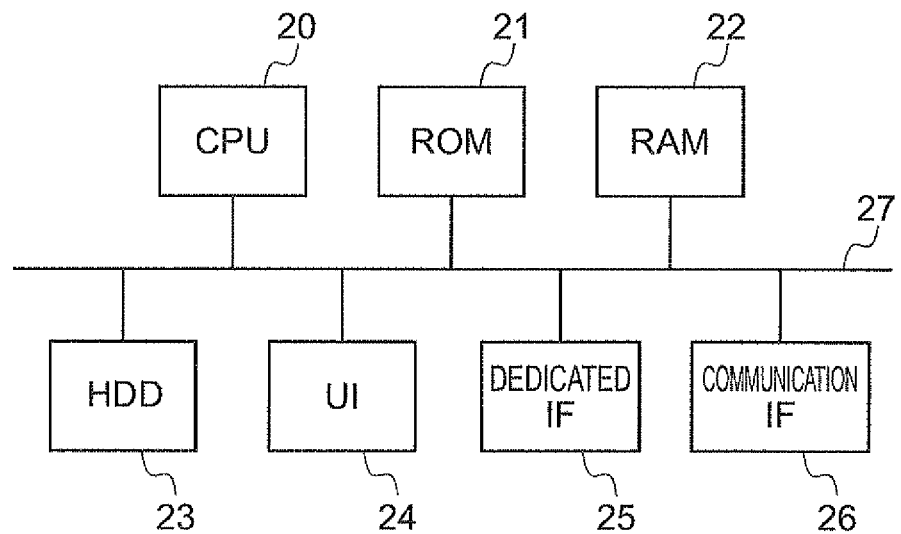
FIG. 2 is a drawing showing an example of the structure of a print server.

FIG. 2 is a drawing showing an example of the structure of the print server 12.

The print server 12 of the present exemplary embodiment is structured such that a CPU (Central Processing Unit) 20, a ROM (Read Only Memory) 21, a RAM (Random Access Memory) 22, an HDD (Hard Disk Drive) 23, a UI (User Interface) 24, a dedicated IF (Interface) 25, and a communication IF (Interface) 26 are connected via a bus 27.

The CPU 20 executes programs that are stored in the ROM 21 and the HDD 23, and controls the operation of the print server 12 overall. Programs that the CPU 20 executes (e.g., a program that carries out the aforementioned RIP processing, and the like, refer to FIG. 6 as well), data that is needed for processing of the CPU 20, and the like are stored in the ROM 21. The RAM 22 is used as a work memory.

Programs that the CPU 20 executes and various types of data are stored in the HDD 23.

The storage media for storing the programs that the CPU 20 executes are not limited to the HDD 23 and the ROM 21. For example, the storage medium may be a flexible disk, a DVD disk, a magneto-optical disk, a USB memory (Universal Serial Bus memory), or the like (none of which is illustrated), or may be the storage device of another device that is connected to the communication unit 16.

The UI 24 is structured from a display device and an operation device. The display device is structured by, for example, a liquid crystal display or the like, and displays various types of images, messages, and the like under the control of the CPU 20. The operation device is structured by, for example, a keyboard, a mouse or the like. A user designates various types of information by operating the operation device.

The dedicated IF 25 is an interface for connection to the printer 14.

The communication IF 26 is an interface for carrying out transmission and reception of data with other devices via the communication unit 16.

The client device 10 as well is structured similarly to the print server 12. Programs that the CPU executes at the client device 10 include various types of application software, a program for generating and transmitting print information for printing data that is the object of printing that is generated by application software, and the like.

Figure 3:
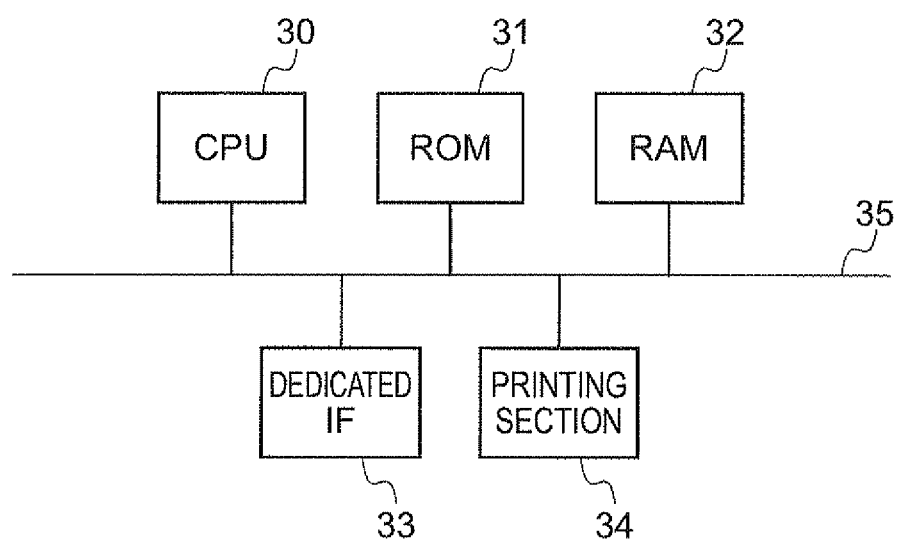
FIG. 3 is a drawing showing an example of the structure of a printer.

FIG. 3 is a drawing showing an example of the structure of the printer 14. Here, an example of the structure of the printer 14, that is connected to the print server 12 without going through the communication unit 16, is described.

The printer 14 is structured by a CPU (Central Processing unit) 30, a ROM (Read Only Memory) 31, a RAM (Random Access Memory) 32, a dedicated IF (Interface) 33, and a printing section 34 being connected via a bus 35.

The CPU 30 executes programs that are stored in the ROM 31 (including, for example, a program that receives image data from the print server 12 and controls the printing section 34 to print on the basis of the image data, and the like), and controls the operations of the printer 14 overall. Programs that the CPU 30 executes, data that is needed for the processing of the CPU 30, and the like are stored in the ROM 31. The RAM 32 is used as a work memory.

The storage medium for storing the programs that the CPU 30 executes is not limited to the ROM 31. For example, the storage medium may be a flexible disk, a DVD disk, a magneto-optical disk, a USB memory, or the like (none of which is illustrated).

The dedicated IF 33 is an interface for connection to the print server 12.

The printing section 34 is a print engine that prints on the basis of image data. The printing section 34 is structured such that a Y image forming unit that forms a Y (yellow) image, an M image forming unit that forms an M (magenta) image, a C image forming unit that forms a C (cyan) image, a K image forming unit that forms a K (black) image are disposed in a tandem form from the upstream side toward the downstream side along the process direction, and the printing section 34 further includes an intermediate transfer belt, primary transfer units, a secondary transfer unit, and a fixing device. The Y image forming unit, the M image forming unit, the C image forming unit and the K image forming unit each have a photoreceptor, a charging device that charges the surface of the photoreceptor, an exposure device that forms an electrostatic latent image by exposing the charged photoreceptor on the basis of the corresponding image data, and a developing device that applies toner of the color corresponding to the image forming unit to the surface of the photoreceptor on which the electrostatic latent image is formed, so as to develop the electrostatic latent image. The respective toner images, that are developed by the developing devices of the respective image forming units, are transferred in a superposed manner onto the intermediate transfer belt from the photoreceptors by the primary transfer units that are provided for the image forming units respectively. Further, the toner image on the intermediate transfer belt is electrically attracted by the secondary transfer unit and is transferred onto a recording sheet. Then, the toner image transferred on the recording sheet is fixed onto the recording sheet at the fixing device.

Note that, here, explanation is given by using, as an example, the printing section that utilizes the intermediate transfer belt. However, the printing section may be a printing section that transfers the toner images directly onto a recording sheet without going via an intermediate transfer belt. Further, here, a tandem-type electrophotographic printing section is exemplified, but the printing section is not limited to the same, and may be, for example, a printing section at which rotary developing devices are provided. Namely, a printing section that is structured as follows may be used. One photoreceptor, one charging device, one exposure device, and developing devices that supply toners of the respective colors of YMCK are provided. Electrostatic latent images are formed on the basis of image data for each color of YMCK on the photoreceptor that has been charged by the charging device, and the electrostatic latent images are developed by the toners. Toner images of the respective colors are thereby formed in order, and are successively transferred onto an intermediate transfer belt. The formed toner images are superposed one on another, and then transferred onto a recording sheet and fixed thereon. Further, the printing section is not limited to an electrophotographic system, and may be an inkjet printing section in which ink drops of the respective colors of YMCK are ejected from recording heads in accordance with image data of the respective colors of YMCK, and printing is carried out while the recording sheet is being conveyed.

Although not illustrated here, in the case of the printer 14 that is directly connected to the communication unit 16, in addition to the above-described structures, the printer 14 has a communication IF for connection to the communication unit 16.

The flow of printing in the present exemplary embodiment is described next.

At the client device 10, data that is the object of printing is generated by application software or the like. Print information, that serves as print commands to the printer, is generated from this data that is the object of printing. The print information includes density information of C, M, Y, K for each of the image elements (hereinafter called objects) that structure the page expressed by the data that is the object of printing.

FIG. 4A shows an example of display when a page 40, that is expressed by the data that is the object of printing, is displayed on the display device of the UI. The page 40 includes a triangular object 41, an oval object 42, an object 43 of the letters ABC, and a rectangular object 44. Thereamong, the objects 43, 44 are objects whose density information is designated to be white (C, M, Y, K)=(0%, 0%, 0%, 0%). The print server 12 generates print information that includes the density information of these objects 41, 42, 43, 44.

The print server 12 generates the print information to also include, in addition to the aforementioned density information, information expressing the shapes and the coordinates of each object. Further, there are cases in which the user carries out setting for overprinting with respect to one or plural objects. If the user carries out an overprint setting, print information that includes setting information of the overprinting is generated.

Overprinting will be discussed here with reference to FIG. 5A through FIG. 5D.

As shown in FIG. 5A through FIG. 5D, if print information of data that is the object of printing, in which the print region of a circular object 50 for which overprinting is set overlaps with at least a portion of the print region of another circular object 52, is subjected to RIP processing and printed, the color of an overlapping region 54 is as follows.

Figure 5A:
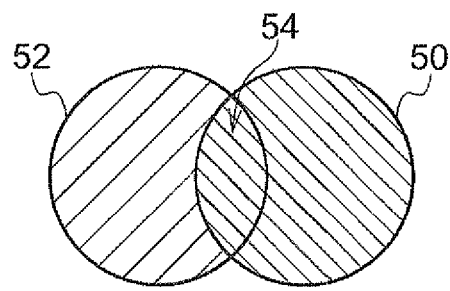
FIG. 5A through FIG. 5D are explanatory drawings for explaining overprinting.

For example, if the density information of the object 50 for which overprinting is set is (C, M, Y, K)=(50%, 50%, 50%, 50%) and the density information of the object 52 is (C, M, Y, K)=(30%, 30%, 30%, 30%), when image data is generated in the RIP processing, as shown in FIG. 5A, bitmap image data in which the densities of the respective colors of the overlap region 54 are densities equal to the densities of the object 50 that is layered above, i.e., (C, M, Y, K)=(50%, 50%, 50%, 50%), is generated. The densities of the overlap region 54 do not become the sums of the densities of the object 50 and the object 52, i.e., do not become (C, M, Y, K)=(80%, 80%, 80%, 80%).

Figure 5B:
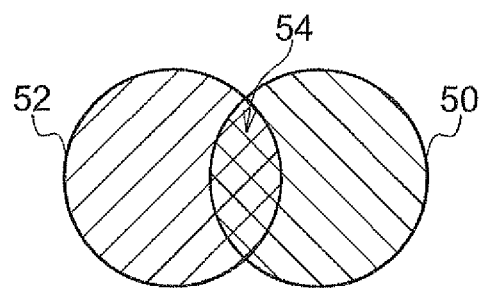

If the density information of the object 50 for which overprinting is set is (C, M, Y, K)=(0%, 0%, 50%, 50%) and the density information of the object 52 is (C, M, Y, K)=(30%, 30%, 30%, 30%), when image data is generated in the RIP processing, as shown in FIG. 5B, there is generated image data in which, among the respective densities of CMYK of the overlap region 54, C and M are the densities of the object 52 that is layered beneath the object 50, and Y and K are the densities of the object 50. Namely, bitmap image data in which the densities of the overlap region 54 are (C, M, Y, K)=(30%, 30%, 50%, 50%) is generated. The densities of the overlap region 54 do not become the sums of the densities of the object 50 and the object 52, i.e., do not become (C, M, Y, K)=(30%, 30%, 80%, 80%).

In this way, if the density information of the object 50 for which overprinting is designated is a value that is not 0% (e.g., even if it is 1%), the density expressed by the density information of the object 50 that is layered above becomes the density of the overlap region 54. Conversely, if the density information of the object 50 for which overprinting is designated is 0%, the density expressed by the density information of the object 52 that is layered beneath becomes the density of the overlap region 54.

Figure 5C:
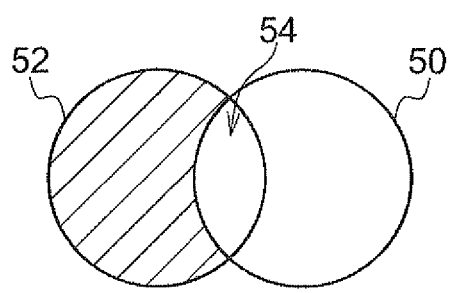
Figure 5D:
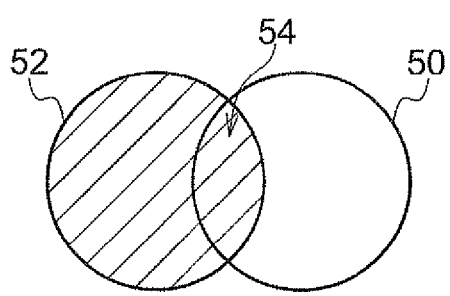

Here, if the user designates the color of the object 50 for which overprinting is designated to be (C, M, Y, K)=(0%, 0%, 0%, 0%), i.e., if the user designates the color to be white, when bitmap image data is generated and printing is carried out by a conventional method from the density information of that object 50 and print information in which overprinting is set, regardless of the fact that the user wishes to print the white object 50 in a state of being layered on the other object 52 (i.e., the user wishes to print the overlap region 54 in white) as shown in FIG. 5C, the density information (C, M, Y, K)=(30%, 30%, 30%, 30%) of the object 52 that is layered beneath is prioritized, and results of printing that are not what the user intended are obtained as shown in FIG. 5D.

Figure 6:
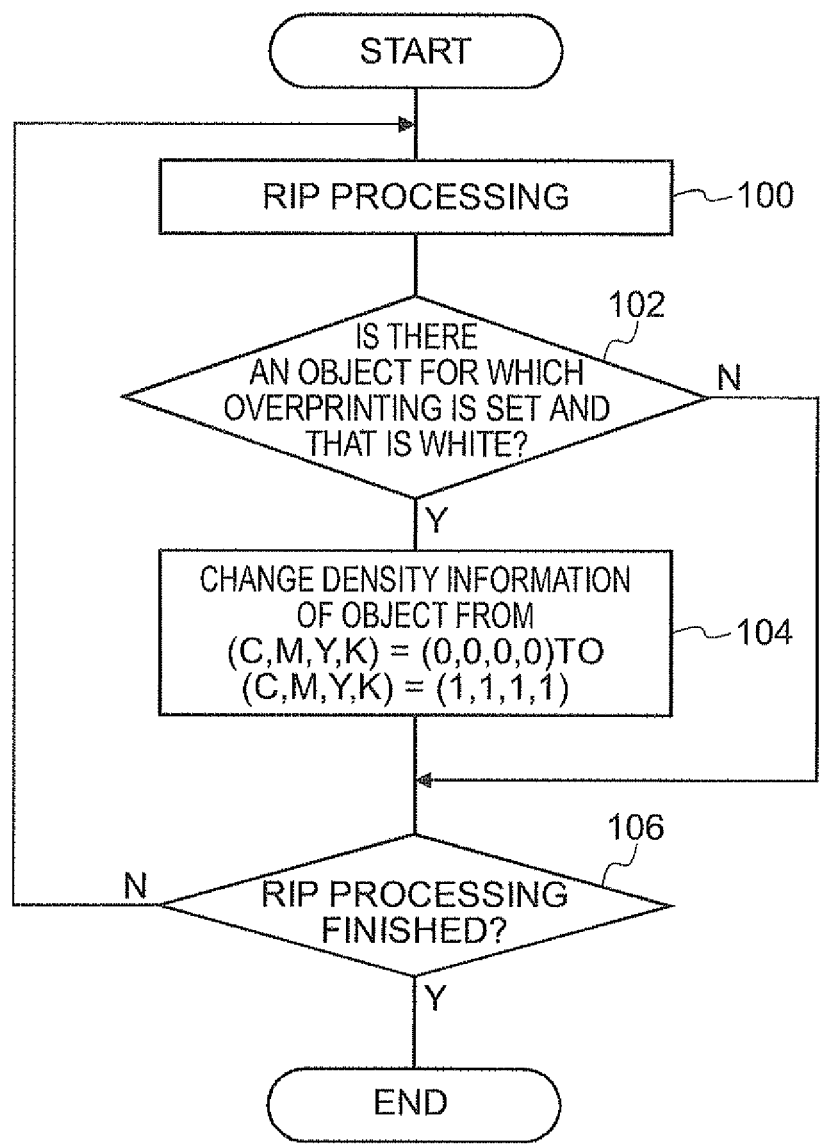
FIG. 6 is a flowchart showing the flow of a processing routine that the print server executes.

Thus, in the present exemplary embodiment, when the print server 12 receives print information from the client device 10, the print server 12 executes the program of the processing routine shown in FIG. 6 and generates image data.

In the following description, the density information is expressed in 256 gradations. Namely, (C, M, Y, K)=(0%, 0%, 0%, 0%) is (C, M, Y, K)=(0, 0, 0, 0), and (C, M, Y, K)=(100%, 100%, 100%, 100%) is (C, M, Y, K)=(255, 255, 255, 255).

In step 100, RIP processing is executed. Namely, the print information received from the client device 10 is analyzed, and intermediate data is generated. The intermediate data is data before bitmap image data is generated, and is data of a form in which respective types of information needed for printing are associated with the respective objects. Image processing per object may be carried out from this intermediate data. In the present exemplary embodiment, the density information of each object is detected from the intermediate data, and it is detected whether or not overprinting is set.

In step 102, it is judged whether or not there is an object for which overprinting is set and that is white (here, (C, M, Y, K)=(0, 0, 0, 0)). If the judgment is affirmative, the routine moves on to step 104. If the judgment is negative, the routine moves on to step 106.

In step 104, the density information of the object for which overprinting is set and that is white (C, M, Y, K)=(0, 0, 0, 0), is changed to (C, M, Y, K)=(1, 1, 1, 1). (C, M, Y, K)=(1, 1, 1, 1) is density information that may be recognized as white by the naked eye. This changing processing is carried out on the intermediate data before bitmap expansion. However, for example, the density information may be changed at a section that carries out color correction during the RIP processing.

In step 106, it is judged whether or not RIP processing is finished. If RIP processing is not finished, the routine returns to step 100. While RIP processing is continued, detection of an object for which overprinting is designated and that is white is carried out as described above during the RIP processing, and if such an object is detected, changing of the density information is carried out in step 104. When detection of the density information per object and detection of an overprinting setting are finished, and the various types of image processings that are necessary in the RIP processing (including the changing processing of above step 104) are finished, the intermediate data is converted, and a version (bitmap image data) of each of CMYK is generated. Because the density information of an object that is white and for which overprinting is set is changed to (C, M, Y, K)=(1, 1, 1, 1) as described above, a region that overlaps with another object is expanded into bitmap with densities of (C, M, Y, K)=(1, 1, 1, 1), regardless of the density information of that other object. When the bitmap image data of the respective colors is generated, in step 106, it is judged that the RIP processing is finished, and the present processing routine ends.

Although not mentioned above, in the RIP processing, there are cases in which various image processings (e.g., processing that expands compression, or the like) other than the processings of steps 104, 106 are carried out per object on the generated intermediate data before being converted into bitmap.

The image data of each color that is generated by the RIP processing is outputted to the printer 14 via the dedicated IF 25. For the printer 14 that is connected via the communication unit 16, the image data is outputted via the communication IF 26. The printer 14 that receives the image data carries out printing by using the received image data.

A concrete example will be described. If overprinting is set for each of the white objects 43, 44 as shown in FIG. 4A, the density information of both of the objects 43, 44 are changed to (C, M, Y, K)=(1, 1, 1, 1), and, in this changed state, are expanded into bitmap. The results of printing using this image data are shown in FIG. 4C.

As shown in FIG. 4C, for the object 43 whose printing region overlaps with the other object 42, because the density information is (C, M, Y, K)=(1, 1, 1, 1), the density of the overlap region (in this example, the entire print region of the object 43 is the region that overlaps with the print region of the object 42), is formed by prioritizing the density information (C, M, Y, K)=(1, 1, 1, 1) of the object 43. Although the density information of the region of the object 43 is (C, M, Y, K)=(1, 1, 1, 1), $1/255$ of a color is recognized as white by the naked eye. Accordingly, letters that are apparently white are on top.

The object 44 is not a region that overlaps with another region. However, because the object 44 is an object for which overprinting is designated and that is white, the object 44 is formed by being changed to (C, M, Y, K)=(1, 1, 1, 1) as described above. Although the density information of the region of the object 44 is (C, M, Y, K)=(1, 1, 1, 1), in the same way as the object 42, the object 44 is recognized as white by the naked eye.

On the other hand, if the processings of above-described steps 104, 106 are not carried out and bitmap image data is generated with the original density information (C, M, Y, K)=(0, 0, 0, 0) as is, as described above, the density information of the object 42 that is layered beneath is used, and not the density information of the object 43. Therefore, the results of printing shown in FIG. 4B are obtained.

Figure 7:
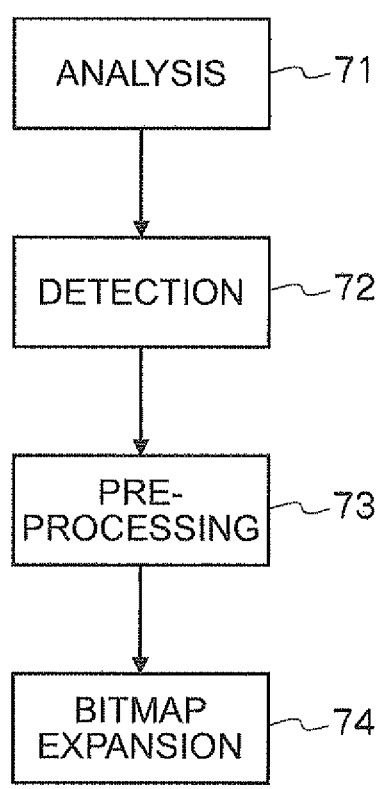
FIG. 7 is a block diagram showing the functional structures (in RIP processing) of the print server relating to the exemplary embodiment.

A block diagram showing the functional structures (in RIP processing) of the print server 12 relating to the above-described exemplary embodiment is shown in FIG. 7.

An analyzing section 71 analyzes the print information received from the client device 10, and generates intermediate data as described above.

A detecting section 72 detects density information per object from the intermediate data generated at the analyzing section 71, and detects whether or not overprinting is set.

If an object for which overprinting is set and that is white (here, whose density information is (C, M, Y, K)=(0, 0, 0, 0))

is detected at the detecting section 72, a pre-processing executing section 73 changes that density information to (C, M, Y, K)=(1, 1, 1, 1). The density information of the other objects is not changed here.

A bitmap expanding section 74 expands (converts) the intermediate data into bitmap image data. For an object whose density information has been changed by the pre-processing executing section 73, bitmap image data is generated so as to be image data that corresponds to the density information after the change. For an object whose density information has not been changed, bitmap image data is generated so as to be image data that corresponds to the density information as is. As described above, the density information of an object that is white and for which overprinting is set is changed to (C, M, Y, K)=(1, 1, 1, 1) at the pre-processing executing section 73. Therefore, the overlap region with another object is expanded into bitmap with densities of (C, M, Y, K)=(1, 1, 1, 1), regardless of the density information of that other object.

In the RIP processing, after the analysis at the analyzing section 71, various types of image processings, other than the pre-processing at the pre-processing executing section 73, are carried out on the intermediate data, but description thereof is omitted here.

In the above exemplary embodiment, description is given of an example of realizing the functions shown in FIG. 7 by carrying out the above-described processing routine by the CPU 20 of the print server 12 executing a program. However, the present invention is not limited to the same, and, for example, the functions shown in FIG. 7 may be realized by hardware.

In the above exemplary embodiment, description is given of an example in which, if an object for which overprinting is set and that is white (here, whose density information is (C, M, Y, K)=(0, 0, 0, 0)) is detected, the density information thereof is changed to (C, M, Y, K)=(1, 1, 1, 1). However, the present invention is not limited to the same. The density information after changing is, of course, not limited to (C, M, Y, K)=(1, 1, 1, 1), provided that it is density information in which the density information of the respective colors of CMYK are greater than 0% and that may be recognized as white by the naked eye e.g., (C, M, Y, K)=(2, 2, 2, 2) or the like. Further, it is not limited to a case in which all of density information of CMYK are 0, however, the present invention is applied to an overprinting, of course, in a case in which density information of one of CMYK is 0. The density information of the one of CMYK may be changed to be greater than 0% and to be density information which may not be recognized by the naked eye and an overprinting may be carried out. Here, the density information is expressed by 256 gradations, but is not limited to 256 gradations provided that it is information that expresses density.

Although the exemplary embodiment describes a case in which a color image is printed by using C, M, Y, K as basic colors, the present invention is not limited to the same, and may also be applied to cases in which a monochrome image is printed by a single color. Specifically, at the client device 10, print information that includes, for example, density information of K may be generated, and, at the print server 12, for each object, that density information may be detected and it may be judged whether or not overprinting is set. If an object at which that density information is 0% and for which overprinting is set is detected, that density information may be changed to density information that is greater than 0% and that may be recognized as white by the naked eye, and bitmap image data of K may be generated as described above.

The above exemplary embodiment describes an example in which the print server 12 carries out RIP processing on the print information and generates image data, but the present invention is not limited to the same. For example, the printer 14 itself may receive the print information and carry out RIP processing. Namely, the functions shown in above-described FIG. 6 and FIG. 7 may be provided at the printer 14.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to be suited to the particular use contemplated. It is intended that the scope of the invention be defined by the following claims and their equivalents.

What is claimed is:

1. An image processing device comprising:
a detecting unit that, before image data, which is generated from print information including a first density information per image element, is generated for a printer which prints an image by using the image data, detects the first density information per image element which is included in the print information, and that detects, for the image elements, whether or not overprinting is set; and
a pre-processing executing unit that, before the image data is generated, if the detecting unit detects that the overprinting is set at an image element and the image element has a basic color of which the first density information is set to 0%, executes a pre-processing which changes the first density information of the image element into a second density information which is greater than 0% such that a color of another image element which is layered beneath the image element is not output in a region in which the overprinting is set.

2. An image processing device comprising:
a detecting unit that, before image data of each of a plurality of basic colors, which is generated from print information including a first density information of each of the plurality of basic colors per image element, is generated for a printer which prints an image by using the image data of each of the basic colors, detects the first density information of each of the plurality of basic colors per image element which is included in the print information, and that detects, for the image elements, whether or not overprinting is set; and
a pre-processing executing unit that, before the image data of each of the basic colors is generated, executes a pre-processing which changes the first density information of each of the basic colors of an image element, at which it is detected by the detecting unit that overprinting is set and the first density information of each of the basic colors is set to 0%, into a second density information which is greater than 0% such that a color of another image element which is layered beneath the image element is not output in a region in which the overprinting is set.

3. A non-transitory computer readable medium storing a program causing a computer to execute an image processing before image data, which is generated from print information including a first density information per image element, is generated for a printer which prints an image by using the image data, the image processing comprising:

detecting the first density information per image element which is included in the print information;

detecting, for the image elements, whether or not overprinting is set; and if it is detected that the overprinting is set at an image element and the image element has a basic color of which first density information is set to 0%, changing the first density information of the image element into a second density information which is greater than 0% such that a color of another image element which is layered beneath the image element is not output in a region in which the overprinting is set.

4. A non-transitory computer readable medium storing a program causing a computer to execute an image processing before image data of each of a plurality of basic colors, which is generated from print information including a first density information of each of the plurality of basic colors per image element, is generated for a printer which prints an image by using the image data of each of the basic colors, the image processing comprising:

detecting the first density information of each of the plurality of basic colors per image element which is included in the print information;

detecting, for the image elements, whether or not overprinting is set; and changing the first density information of each of the basic colors of an image element, at which it is detected that overprinting is set and the first density information of each of the basic colors is set to 0%, into a second density information which is greater than 0% such that a color of another image element which is layered beneath the image element is not output in a region in which the overprinting is set.

5. An image processing method comprising:

detecting a first density information per image element which is included in the print information;

detecting, for the image elements, whether or not overprinting is set; and if it is detected that the overprinting is set at an image element and the image element has a basic color of which the first density information is set to 0%, changing the first density information of the image element into a second density information which is greater than 0% such that a color of another image element which is layered beneath the image element is not output in a region in which the overprinting is set.

6. An image processing method comprising:

detecting a first density information of each of the plurality of basic colors per image element which is included in the print information;

detecting, for the image elements, whether or not overprinting is set; and changing the first density information of each of the basic colors of an image element, at which it is detected that overprinting is set and the first density information of each of the basic colors is set to 0%, into a second density information which is greater than 0% such that a color of another image element which is layered beneath the image element is not output in a region in which the overprinting is set.

7. An image processing device comprising:

a detecting unit that, before image data of each of a plurality of basic colors, which is generated from print information including a first density information of each of the plurality of basic colors per image element, is generated for a printer which prints an image by using the image data of each of the basic colors, detects the first density information of each of the plurality of basic colors per image element which is included in the print information, and that detects, for the image elements, whether or not overprinting is set; and a pre-processing executing unit that, before the image data of each of the basic colors is generated, executes a pre-processing which changes the first density information of each of the basic colors for which the first density information is set to 0% of an image element, at which it is detected by the detecting unit that overprinting is set and the first density information of each of the basic colors is set to 0%, into a second density information which is greater than 0% such that a color of another image element which is layered beneath the image element is not output in a region in which the overprinting is set.

8. A non-transitory computer readable medium storing a program causing a computer to execute an image processing before image data of each of a plurality of basic colors, which is generated from print information including a first density information of each of the plurality of basic colors per image element, is generated for a printer which prints an image by using the image data of each of the basic colors, the image processing comprising:

detecting the first density information of each of the plurality of basic colors per image element which is included in the print information;

detecting, for the image elements, whether or not overprinting is set; and changing the first density information of each of the basic colors for which the first density information is set to 0% of an image element, at which it is detected that overprinting is set and the first density information of each of the basic colors is set to 0%, into a second density information which is greater than 0% such that a color of another image element which is layered beneath the image element is not output in a region in which the overprinting is set.

9. An image processing method comprising:

detecting a first density information of each of the plurality of basic colors per image element which is included in the print information;

detecting, for the image elements, whether or not overprinting is set; and changing the first density information of each of the basic colors for which the first density information is set to 0% of an image element, at which it is detected that overprinting is set and the first density information of each of the basic colors is set to 0%, into a second density information which is greater than 0% such that a color of another image element which is layered beneath the image element is not output in a region in which the overprinting is set.

10. The image processing device of claim 1, wherein the first density information is (C, M, Y, K)=(0, 0, 0, 0) and the second density information is (C, M, Y, K)=(1, 1, 1, 1).

* * * * *